(12) United States Patent
Asada et al.

(10) Patent No.: US 7,986,607 B2
(45) Date of Patent: Jul. 26, 2011

(54) WAVE PLATE, OPTICAL PICKUP AND OPTICAL DISC APPARATUS

(75) Inventors: Jun-ichi Asada, Hyogo (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/723,777

(22) Filed: Mar. 15, 2010

(65) Prior Publication Data

US 2010/0232272 A1    Sep. 16, 2010

(30) Foreign Application Priority Data

Mar. 16, 2009   (JP) ................. 2009-062323

(51) Int. Cl.
*G11B 7/00* (2006.01)
(52) U.S. Cl. ............ 369/112.16; 369/112.22; 369/44.37
(58) Field of Classification Search ............. 369/112.16, 369/112.17, 112.21, 112.22, 110.02, 110.04, 369/44.23, 112.01, 44.37
See application file for complete search history.

(56) References Cited

U.S. PATENT DOCUMENTS

| | | | | |
|---|---|---|---|---|
| 6,819,646 | B1* | 11/2004 | Kitaoka et al. ........... | 369/112.01 |
| 6,980,505 | B2* | 12/2005 | Katayama et al. ....... | 369/112.17 |
| 7,050,380 | B2* | 5/2006 | Hirai et al. ............... | 369/112.17 |
| 7,224,661 | B2* | 5/2007 | Ooto ........................ | 369/110.04 |
| 7,324,424 | B2* | 1/2008 | Kim et al. ................ | 369/112.17 |
| 2005/0180296 | A1* | 8/2005 | Ooto ........................ | 369/112.22 |
| 2005/0219987 | A1* | 10/2005 | Hashimura et al. ...... | 369/112.23 |
| 2006/0077858 | A1 | 4/2006 | Asada et al. | |
| 2006/0146682 | A1* | 7/2006 | Sharp ....................... | 369/112.01 |
| 2008/0310285 | A1* | 12/2008 | Oto .......................... | 369/112.16 |
| 2010/0128593 | A1* | 5/2010 | Murata et al. ............ | 369/112.23 |

FOREIGN PATENT DOCUMENTS

JP    2007-188577    7/2007

* cited by examiner

*Primary Examiner* — Thang Tran
(74) *Attorney, Agent, or Firm* — Renner, Otto, Boisselle & Sklar, LLP (57) ABSTRACT

An optical pickup includes a wave plate on an optical path to be followed by every light beam emitted from three light sources (with wavelengths $\lambda_1$, $\lambda_2$ and $\lambda_3$, respectively) both on their way toward an optical disc and back from the disc toward a photodetector. The wave plate has two layers with different retardations and different optic axis directions. The sum of the retardations of the first and second layers is defined to be approximately $5/4\lambda_1$, $3/4\lambda_2$ and $1/2\lambda_3$ to the light beams with the wavelengths $\lambda_1$, $\lambda_2$ and $\lambda_3$.

5 Claims, 6 Drawing Sheets

WAVE PLATE, OPTICAL PICKUP AND OPTICAL DISC APPARATUS

BACKGROUND OF THE INVENTION

1. Field of the Invention

The present invention relates to a wave plate for use to get polarization conversion done appropriately on three light beams with mutually different wavelengths. The present invention also relates to an optical pickup with a laser light source that can emit laser beams with mutually different wavelengths for use to read and/or write a signal from/on multiple different types of optical discs such as CDs, DVDs and Blu-ray Discs (which will be referred to herein as "BDs") and an optical disc apparatus including such an optical pickup.

2. Description of the Related Art

Recently, in the field of optical information storage including optical disc technologies, various standards have been set up one after another and a variety of storage media, compliant with those standards, has become increasingly popular year by year. To keep up with those trends, appliances that can read and/or write information from/on those various types of storage media have also become more and more popular nowadays.

Specifically, various storage media compliant with mutually different standards in terms of storage density, storage capacity and transmissive layer thickness, such as CDs, DVDs and BDs, are now available almost everywhere. Under the circumstances such as these, optical disc apparatuses compatible with multiple wavelengths, which can choose an appropriate one of the multiple wavelengths by recognizing the type of the given optical disc to be a CD, a DVD or a BD and which can read, erase, and/or write information from/on it by itself, have been put on the market in increasing numbers. Such optical disc apparatuses are called "combo drives".

In such a multi-wave-compatible optical disc apparatus, multiple light sources that have mutually different wavelengths (which will be referred to herein as just "multiple light sources") are built in an optical pickup, which is an interface section for reading and/or writing information from/on those storage media.

However, in order to reduce the overall size or cost of optical disc apparatuses, a lot of people believe it important to lay out the optical system of such an optical pickup with multiple light sources as compact as possible. Naturally, however, the fundamental read/write functions need to be maintained even in that case.

The greater the number of members to assemble together, the larger the number of assembling process steps required and the bigger the manufacturing cost of the optical pickup. To overcome such a problem, Japanese Patent Application Laid-Open Publication No. 2007-188577 (which will be referred to herein as "Patent Document No. 1") proposes an optical pickup that is compatible with three different types of storage media such as CDs, DVDs and BDs but that has a simplified optical system. In the optical pickup disclosed in Patent Document No. 1, a photodetector and multiple light sources are integrated together, and a wave plate for getting polarization conversion done appropriately according to the detected one of the wavelengths and a hologram with the best diffraction efficiently are combined together, thereby simplifying the optical pickup.

Figure 5:
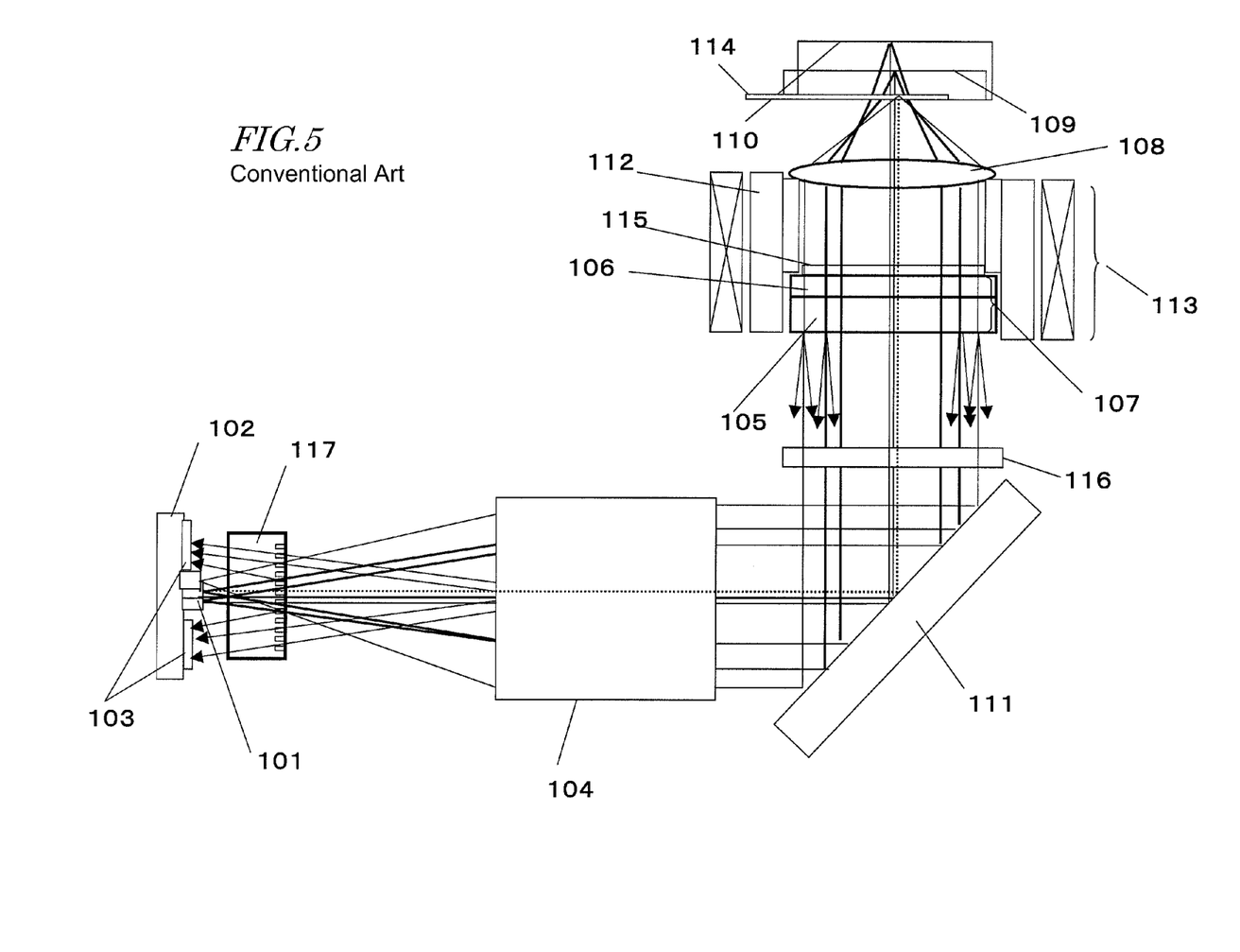
FIG. 5 illustrates an overall arrangement of a conventional optical pickup including a unit in which multiple light sources and a photodetector are integrated together and a polarizing or non-polarizing hologram element in combination.

FIG. 5 illustrates an overall arrangement of a conventional optical pickup including a unit in which multiple light sources and a photodetector are integrated together and a polarizing or non-polarizing hologram element in combination.

In this optical pickup, laser chips 101 for emitting laser beams with multiple different wavelengths and a photodetector 103 that is used in common to receive all of those laser beams with the multiple wavelengths are integrated together on a unit 102.

Also, a non-polarizing hologram 117 is arranged near the unit 102. The hologram 117 transmits light with a wavelength $\lambda_1$ (e.g., light with a wavelength of 405 nm for use to scan a BD) or light with a wavelength $\lambda_2$ (e.g., light with a wavelength of 660 nm for use to scan a DVD) without diffracting it. And the hologram 117 transmits most of light with a wavelength $\lambda_3$ (e.g., light with a wavelength of 780 nm, at which a read/write operation is supposed to be performed on a CD) as zero-order light without diffracting it but does diffracts just a portion of the light and produces first-order diffracted light. On the other hand, due to its polarization dependence, a polarizing hologram 105 perfectly transmits linearly polarized light that has been emitted from a laser light source but diffracts almost all of linearly polarized light that is perpendicular to the former linearly polarized light.

A wave plate 106 is set up to have a retardation (which will also be referred to herein as a "phase difference") represented by $N1 \pm \lambda_1/4$ (where N1 is an integer) with respect to the light with the wavelength $\lambda_1$. This is equivalent to a quarter-wave plate. The wave plate 106 is also set up to have a retardation represented by $N2 \pm \lambda_2/4$ (where N2 is an integer) with respect to the light with the wavelength $\lambda_2$. With respect to the light with the wavelength $\lambda_3$, however, the wave plate 106 is set up to have a retardation represented by $N3\lambda_3$. This is equivalent to a full-wave plate.

The light with the wavelength $\lambda_1$ and the light with the wavelength $\lambda_2$ being transmitted through the polarizer 107 is not diffracted by the polarizing hologram 105 but is transformed by the wave plate 106 into circularly polarized light. The circularly polarized light has its aperture adjusted appropriately by a wavelength selective film 115, of which the transmittance varies according to the wavelength of the light, and then is incident on an optical disc through an objective lens 108. On its way back from the information storage layer of the disc, the reflected light is transformed by the wave plate 106, which functions just like a quarter-wave plate this time, into linearly polarized light, of which the polarization direction is perpendicular to that of the emitted laser beam, and therefore, is diffracted and branched by the polarizing hologram 105. This diffracted light is not diffracted by, but transmitted through, the hologram 117 with no polarization dependence and then is incident on the photodetector 103. Then, based on a variation in its intensity, control signals for performing a focus control, a tracking control and other kinds of controls and an RF signal are generated.

On the other hand, the light with the wavelength $\lambda_3$ of 780 nm (at which a read/write operation is supposed to be performed on a CD) is incident as linearly polarized light on the wave plate 106. As described above, the wave plate 106 functions just like a full-wave plate this time. That is why the linearly polarized light with the wavelength $\lambda_3$ leaves the wave plate 106 while maintaining its linear polarization and then is condensed onto the surface of the optical disc. That linear polarization will still be maintained even after that light is reflected from the information storage layer of the disc and then is transmitted through the wave plate 106 on its way back. Consequently, this reflected light is not diffracted or branched by the hologram 105 but is diffracted and branched by the hologram 117. As a result, light with a constant intensity always strikes the photodetector 103. And based on a variation in its intensity, control signals for performing a focus control, a tracking control and other kinds of controls and an RF signal are generated.

The transmissive layer of a CD, for example, is relatively thick and normally has birefringence. According to the direction in which the resin material flowed while the transmissive layer was molded, the birefringence of the transmissive layer has its axis of index ellipsoid defined in either the disc radial direction or the tracking direction. If this wave plate 106 is used for a CD, for example, linearly polarized light, of which the polarization direction is parallel to that axis of birefringence, is transmitted through the transmissive layer of the disc both on its way to, and back from, the information storage layer of the disc. That light is hardly affected as far as the polarization is concerned and causes no diffraction loss even when passing through the polarizing hologram.

On top of that, since the hologram 117 that produces light for use to generate control signals and an RF signal is non-polarizing, the intensity of the optical signal never varies significantly even if the transmissive layer has some birefringence. Consequently, good read performance can be eventually achieved with stability.

As for light with the wavelength $\lambda_1$ for use to scan a BD or a DVD, on the other hand, it is difficult to further increase the output power of its laser light source. Also, the reflectance from such an optical disc is not as high as the one from a CD. For that reason, the optical efficiency counts when the light passes through the optical system on its way toward, and back from, the optical disc. The light with this wavelength $\lambda_1$ can be perfectly transmitted by the polarizing hologram on its way toward the disc and can have its efficiency maintained by the total diffraction function on its way back from the disc. As used herein, the "perfect transmission" means that the diffraction grating is quite invisible to the light on its way toward the disc due to its polarization direction and the light is just transmitted through the diffraction grating without getting diffracted by it at all. On the other hand, the "total diffraction" means that the diffraction grating is visible to the light on its way back from the disc due to its polarization direction and that the grating condition is defined so as to achieve maximum diffraction efficiency.

Also, as the transmissive layer of a BD or a DVD is thinner than that of a CD, the transmissive layer produces a much smaller degree of birefringence and the light reflected from the disc will not have its polarization state affected so much. That is why even if there is birefringence, its degree is so small that the intensity of the optical signal hardly varies.

The following Table 1 summarizes wave plate phase difference (retardation) conditions that need to be met to satisfy the conditions described above as disclosed in Patent Document No. 1. According to Patent Document No. 1, the magnitude of retardation is determined proportionally to each wavelength. For that reason, the specifications of the wave plate are determined so that the wave plate has a retardation represented by $N1\pm\lambda_1/4$ (where N1 is an integer) with respect to light with the wavelength $\lambda_1$, a retardation represented by $N2\pm\lambda_2/4$ (where N2 is an integer) with respect to light with the wavelength $\lambda_2$, and a retardation represented by $N3\ \lambda_3$ (where N3 is an integer) with respect to light with the wavelength $\lambda_3$ and that the wave plate has the smallest thickness.

TABLE 1

Wave plate retardation values

| λ (nm) | $\lambda_1$ (405) | $\lambda_2$ (660) | $\lambda_3$ (780) |
|---|---|---|---|
| Example of design | 7.75 $\lambda_1$ | 4.756 $\lambda_2$ | 4.024 $\lambda_3$ |

For conventional wave plates and optical pickups, various measures have been taken to simplify the optical system and to stabilize signal qualities with respect to respective wavelengths as much as possible.

Those wave plates, however, are too thick for the respective wavelengths. Specifically, even according to the condition that will produce the smallest retardation shown in Table 1, the thickness of the wave plates is still five to eight times as large as the wavelength.

Figure 6:
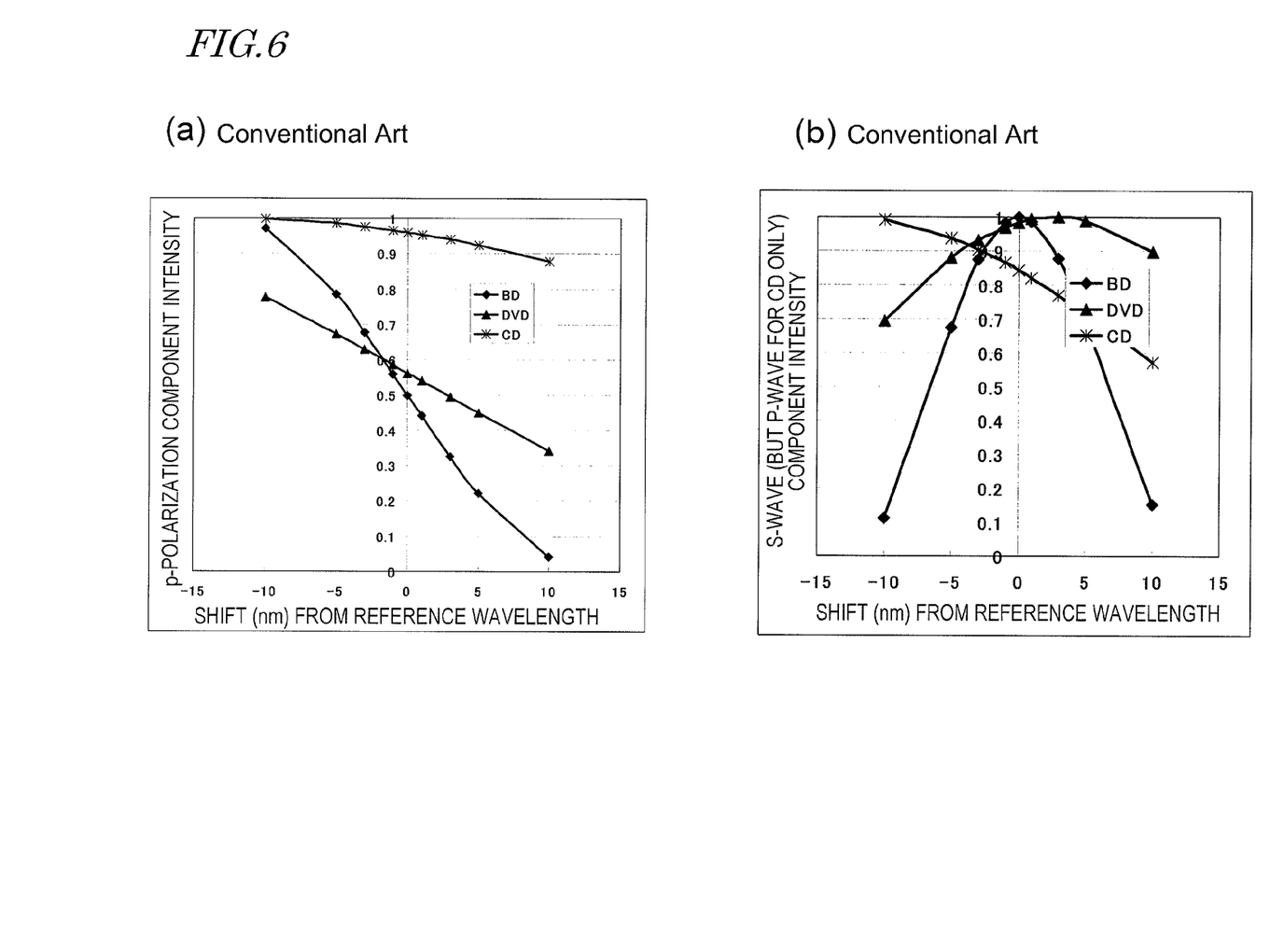
FIGS. 6(a) and 6(b) plot the intensities of polarized wave components with respect to a shift from a reference wavelength in the conventional optical pickup.

FIGS. 6(*a*) and 6(*b*) plot the intensities of polarized wave components with respect to the shift from a reference wavelength. In FIGS. 6(*a*) and 6(*b*), a wave, of which the polarization direction is the same as that of the light emitted from a laser light source (i.e., the polarization direction of the light that is on the verge of entering the wave plate on its way toward the disc), is defined to be a "P-wave", while a wave, of which the polarization direction intersects with that of the P-wave at right angles, is defined to be an "S-wave".

In FIG. 6, the abscissa represents the magnitude of shift from a reference wavelength, while the ordinate represents a value (component intensity) indicating the polarization state of the light that has passed through a given element on its way toward, and back from, the disc. More specifically, the numerical value representing the polarization state as the ordinate is the transmission intensity of polarized light as viewed through a linear polarizer. For example, supposing the transmitted light intensity of linearly polarized S wave is zero, that of linearly polarized P wave will be one and that of circularly polarized light, which is an intermediate wave between the S and P waves, will be 0.5.

Specifically, FIG. 6(*a*) shows the polarization state of the light that has just been transmitted through the wave plate of the optical system on its way toward the disc. As described above, at the reference wavelength (i.e., at an abscissa of zero), both the light with the wavelength $\lambda_1$ (for use to scan a BD) and the light with the wavelength $\lambda_2$ (for use to scan a DVD) are transformed into circularly polarized light on their way toward the disc, and therefore, their ordinate has a value of approximately 0.5. On the other hand, the light with the wavelength $\lambda_3$ (for use to scan a CD) remains linearly polarized light, and therefore, its ordinate has a value of approximately one.

However, as can be seen from FIG. 6(*a*), in both of the light to scan a BD or a DVD and the light to scan a CD, if their wavelength shifts from the reference wavelength, the polarization state of the light changes significantly. In the light to scan a BD that has the shortest wavelength, among other things, its polarization state changes particularly steeply. This is because for such light with a short wavelength, the retardation represented by the following Equation (1) is so great that the polarization state changes significantly according to the wavelength under such a condition.

$$\text{Retardation} = \Delta nd/\lambda \qquad (1)$$

where $\Delta n$ represents the refractive index anisotropy of the wave plate, d represents the thickness of the wave plate, and $\lambda$ represents the wavelength of the light.

FIG. 6(*b*) shows the polarization state of the light that has just been transmitted through the wave plate in the optical system on its way back from the disc. The ordinate plotted in FIG. 6(*b*) represents the intensity of the S wave component for the light to scan a BD or a DVD but represents the intensity of the P wave component for the light to scan a CD.

The light with the wavelength $\lambda_1$ (to scan a BD) and the light with the wavelength $\lambda_2$ (to scan a DVD) are transmitted through the wave plate on their way toward, and back from, the disc. At the reference wavelength (i.e., at an abscissa of zero), the light on its way back from the disc is transformed into linearly polarized light (S wave), of which the polarization direction is substantially perpendicular to that of the light on its way toward the disc. Therefore, the ordinate has a value of approximately one. On the other hand, in a situation where light with the wavelength $\lambda_3$ (to scan a CD) is transmitted through the wave plate, that light remains linearly polarized light on its way back from the disc, and therefore, the ordinate representing the P-wave component has a numerical value of approximately one.

However, as can be seen from FIG. 6(a), once their wavelength shifts from the reference wavelength, their polarization state change significantly, which represents a variation in the intensity of the light reflected from the disc (i.e., a variation in the intensity of the optical signal).

With such a conventional wave plate, if the wavelength of a laser beam emitted from a laser light source varies or if the wavelength changes due to a temperature variation, the polarization state will change so much as to cause deteriorated signal quality (e.g., a significant variation in the intensity of the read light), which is a problem.

SUMMARY OF THE INVENTION

It is therefore an object of the present invention to provide a wave plate, an optical pickup and an optical disc apparatus that can minimize such a variation in read signal that will normally be caused when the wavelength varies.

An optical pickup according to the present invention is designed to emit light toward an optical disc, receive the light that has been reflected from the optical disc, and output a signal representing the intensity of the reflected light. The optical pickup includes: three light sources for emitting three light beams that are linearly polarized and have wavelengths $\lambda_1$, $\lambda_2$ and $\lambda_3$, respectively, where $\lambda_1 < \lambda_2 < \lambda_3$; at least one lens for condensing the light beams that have been emitted from the three light sources; a photodetector for receiving the light beams that have been reflected from the optical disc; and a wave plate, which is arranged on an optical path to be followed by all of the light beams emitted from the three light sources both on their way toward the optical disc and on their way back from the optical disc toward the photodetector. The wave plate has first and second layers, of which the retardations and optic axis directions are different from each other. The sum of the retardations of the first and second layers is defined to be about 5/4 $\lambda_1$, about 3/4 $\lambda_2$ and about 1/2 $\lambda_3$ with respect to the light beams with the wavelengths $\lambda_1$, $\lambda_2$ and $\lambda_3$, respectively. There is a difference in optic axis direction between the first and second layers. By taking advantage of the difference in optic axis direction, the linearly polarized light beams with the wavelengths $\lambda_1$ and $\lambda_2$ on their way toward the optical disc are transformed into circularly polarized light beams, and the circularly polarized light beams on their way back from the optical disc are transformed into linearly polarized light beams, of which polarization direction is perpendicular to that of the light beams on their way toward the optical disc, thereby transmitting the light beam with the wavelength $\lambda_3$ as the linearly polarized light beam both on its way toward, and back from, the optical disc.

The retardation of the first layer of the wave plate may be defined to fall within the range of 0.7 $\lambda_1$ to 0.8 $\lambda_1$ with respect to the light beam with the wavelength $\lambda_1$, the range of 0.4 $\lambda_2$ to 0.5 $\lambda_2$ with respect to the light beam with the wavelength $\lambda_2$, and the range of 0.3 $\lambda_3$ to 0.4 $\lambda_3$ with respect to the light beam with the wavelength $\lambda_3$, respectively. The retardation of the second layer of the wave plate may be defined to fall within the range of 0.4 $\lambda_1$ to 0.5 $\lambda_1$ with respect to the light beam with the wavelength $\lambda_1$, the range of 0.2 $\lambda_2$ to 0.3 $\lambda_2$ with respect to the light beam with the wavelength $\lambda_2$, and the range of 0.2 $\lambda_3$ to 0.3 $\lambda_3$ with respect to the light beam with the wavelength $\lambda_3$, respectively. The optic axis directions of the first and second layers may be defined to form an angle of 40 to 50 degrees and an angle of 50 to 60 degrees, respectively, with respect to any of the incoming linearly polarized light beams.

A wave plate according to the present invention is designed to be used in an optical pickup for emitting light toward an optical disc, receiving the light reflected from the optical disc, and outputting a signal representing the intensity of the reflected light. The optical pickup includes: three light sources for emitting three light beams that are linearly polarized and have wavelengths $\lambda_1$, $\lambda_2$ and $\lambda_3$, respectively, where $\alpha_1 < \lambda_2 < \lambda_3$; at least one lens for condensing the light beams that have been emitted from the three light sources; and a photodetector for receiving the light beams that have been reflected from the optical disc. The wave plate has first and second layers, of which the retardations and optic axis directions are different from each other. The sum of the retardations of the first and second layers is defined to be approximately 5/4 $\lambda_1$, approximately 3/4 $\lambda_2$, and approximately 1/2 $\lambda_3$ with respect to the light beams with the wavelengths $\lambda_1$, $\lambda_2$ and $\lambda_3$, respectively. There is a difference in optic axis direction between the first and second layers. By taking advantage of the difference in optic axis direction, the linearly polarized light beams with the wavelengths $\lambda_1$ and $\lambda_2$ on their way toward the optical disc are transformed into circularly polarized light beams, and the circularly polarized light beams on their way back from the optical disc are transformed into linearly polarized light beams, of which polarization direction is perpendicular to that of the light beams on their way toward the optical disc, thereby transmitting the light beam with the wavelength $\lambda_3$ as the linearly polarized light beam both on its way toward, and back from, the optical disc.

The retardation of the first layer may be defined to fall within the range of 0.7 $\lambda_1$ to 0.8 $\lambda_1$ with respect to the light beam with the wavelength $\lambda_1$, the range of 0.4 $\lambda_2$ to 0.5 $\lambda_2$ with respect to the light beam with the wavelength $\lambda_2$, and the range of 0.32 $\lambda_3$ to 0.4 $\lambda_3$ with respect to the light beam with the wavelength $\lambda_3$, respectively. The retardation of the second layer may be defined to fall within the range of 0.4 $\lambda_1$ to 0.5 $\lambda_1$ with respect to the light beam with the wavelength $\lambda_1$, the range of 0.2 $\lambda_2$ to 0.3 $\lambda_2$ with respect to the light beam with the wavelength $\lambda_2$, and the range of 0.2 $\lambda_3$ to 0.3 $\lambda_3$ with respect to the light beam with the wavelength $\lambda_3$, respectively. And the optic axis directions of the first and second layers may be defined to form an angle of 40 to 50 degrees and an angle of 50 to 60 degrees, respectively, with respect to any of the incoming linearly polarized light beams.

An optical disc apparatus according to the present invention includes: an optical pickup according to any of the preferred embodiments of the present invention described above; a motor for rotating the optical disc; and a control section for controlling the optical pickup and the motor. The control section controls the optical pickup so that a light beam is continuously condensed on an information storage layer of the optical disc in response to an output signal of the optical pickup.

According to the present invention, even if there is any wavelength variation in three light beams with mutually different wavelengths due to a wavelength shift or temperature variation, a read/write operation can still get done with good stability with the variation in the intensity of detected light minimized. In addition, since the number of required members does not increase, the optical system is no less simple than conventional ones. As a result, an optical pickup that can perform a read/write operation on various optical discs with mutually different transmissive layer thicknesses and storage densities using light beams with three different wavelengths is provided in a smaller size and at a reduced cost.

On top of that, the intensity of the light detected can also be stabilized with respect to a disc with a thick transmissive layer and a high degree of birefringence such as CDs. And a high light propagation rate can be maintained with respect to an optical system that uses a short-wave light beam for BDs, DVDs and other optical discs, which have a thin transmissive layer and a low degree of birefringence but for which it is difficult to achieve a high laser output power.

DETAILED DESCRIPTION OF PREFERRED EMBODIMENTS

Hereinafter, preferred embodiments of a polarizer, an optical pickup and an optical disc apparatus according to the present invention will be described with reference to the accompanying drawings. In the following description, any pair of components shown in multiple drawings and having substantially the same function will be identified by the same reference numeral.

Figure 1:
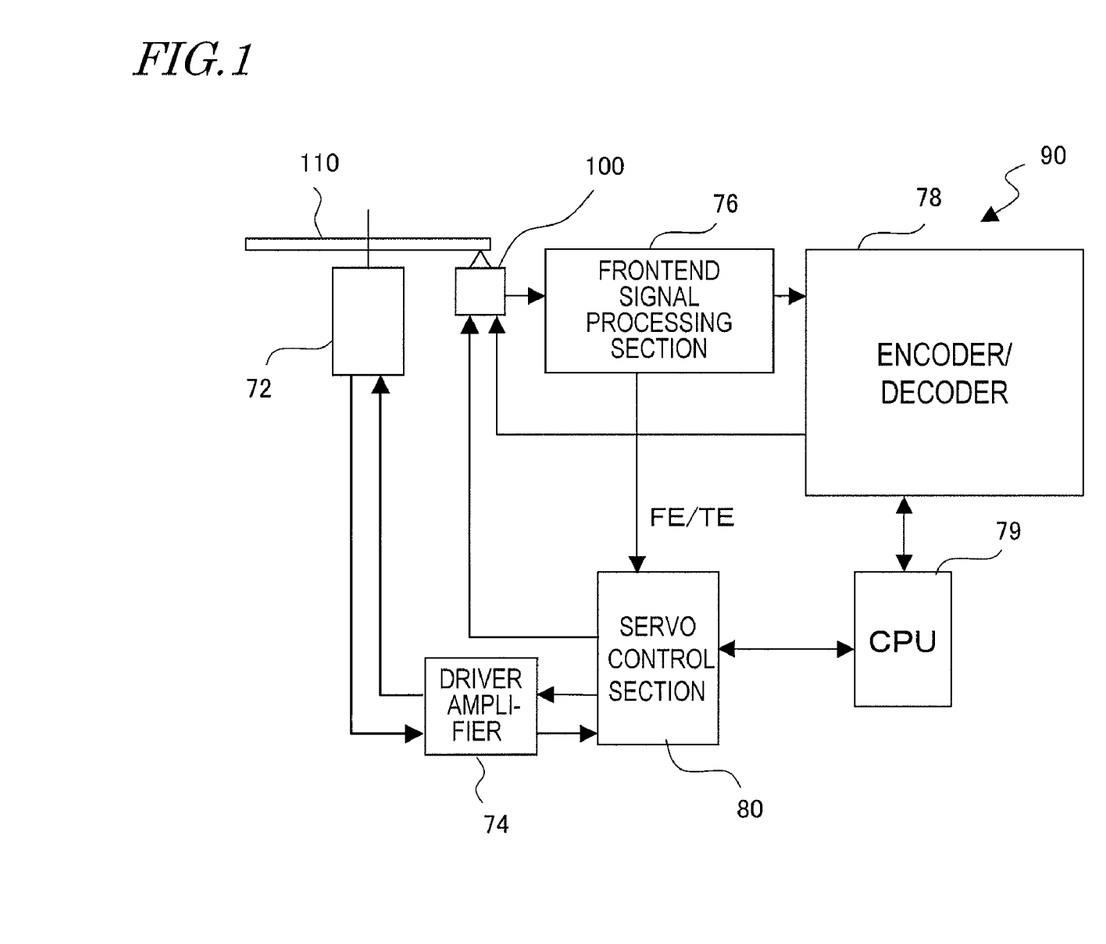
FIG. 1 schematically illustrates a configuration for an optical disc apparatus 90 as a preferred embodiment of the present invention.

FIG. 1 schematically illustrates a configuration for an optical disc apparatus 90 as a preferred embodiment of the present invention. The optical disc apparatus 90 includes an optical pickup 100, a disc motor 72 to rotate an optical disc 110, a driver amplifier 74, a frontend signal processing section 76, an encoder/decoder 78, a CPU 79 and a servo control section 80.

The optical pickup 100 emits a laser beam with a predetermined wavelength toward the optical disc 110, receives its reflected light, and outputs an RF signal representing the intensity of the reflected light received. The RF signal is sent from the optical pickup 100 to the encoder/decoder 78 by way of the frontend signal processing section 76. In reading data, the encoder/decoder 78 decodes the data that is stored on the optical disc 110 based on the signal that has been generated by the optical pickup 100. Then, the decoded data is output to a high-order device (not shown). In writing data, on the other hand, the encoder/decoder 78 encodes the user data to generate a signal to be written on the optical disc 110 and outputs the signal to the optical pickup 100.

The frontend signal processing section 76 generates a read signal and various control signals (including a focus error signal FE and a tracking error signal TE) based on the output of the optical pickup 100. The focus error signal FE and the tracking error signal TE are then supplied to the servo control section 80.

In response, the servo control section 80 gets the disc motor 72 controlled by the driver amplifier 74 using those various control signals. The servo control section 80 also controls the operation of a transport stage (not shown) on which the optical pickup 100 is mounted and which is used to adjust the position of the optical pickup 100. Furthermore, the servo control section 80 gets the position of an objective lens controlled by an actuator (to be described later) in the optical pickup 100.

For example, the servo control section 80 may control the position of the objective lens in the optical pickup 100 perpendicularly to the information storage layer of the optical disc 110 in accordance with the focus error signal FE. As a result, the focal point of the light can be continuously set right on the target information storage layer of the optical disc 110. In addition, in accordance with the tracking error signal TE, the servo control section 80 also controls the position of the objective lens in the radial direction of the optical disc 110. In this manner, the beam spot of the light can continuously follow the tracks on the information storage layer of the optical disc 110. The encoder/decoder 78, the servo control section 80 and all the other components are controlled by the CPU 79.

Hereinafter, the arrangement of the optical pickup 100 of this preferred embodiment will be described with reference to FIGS. 2 to 4.

Figure 2:
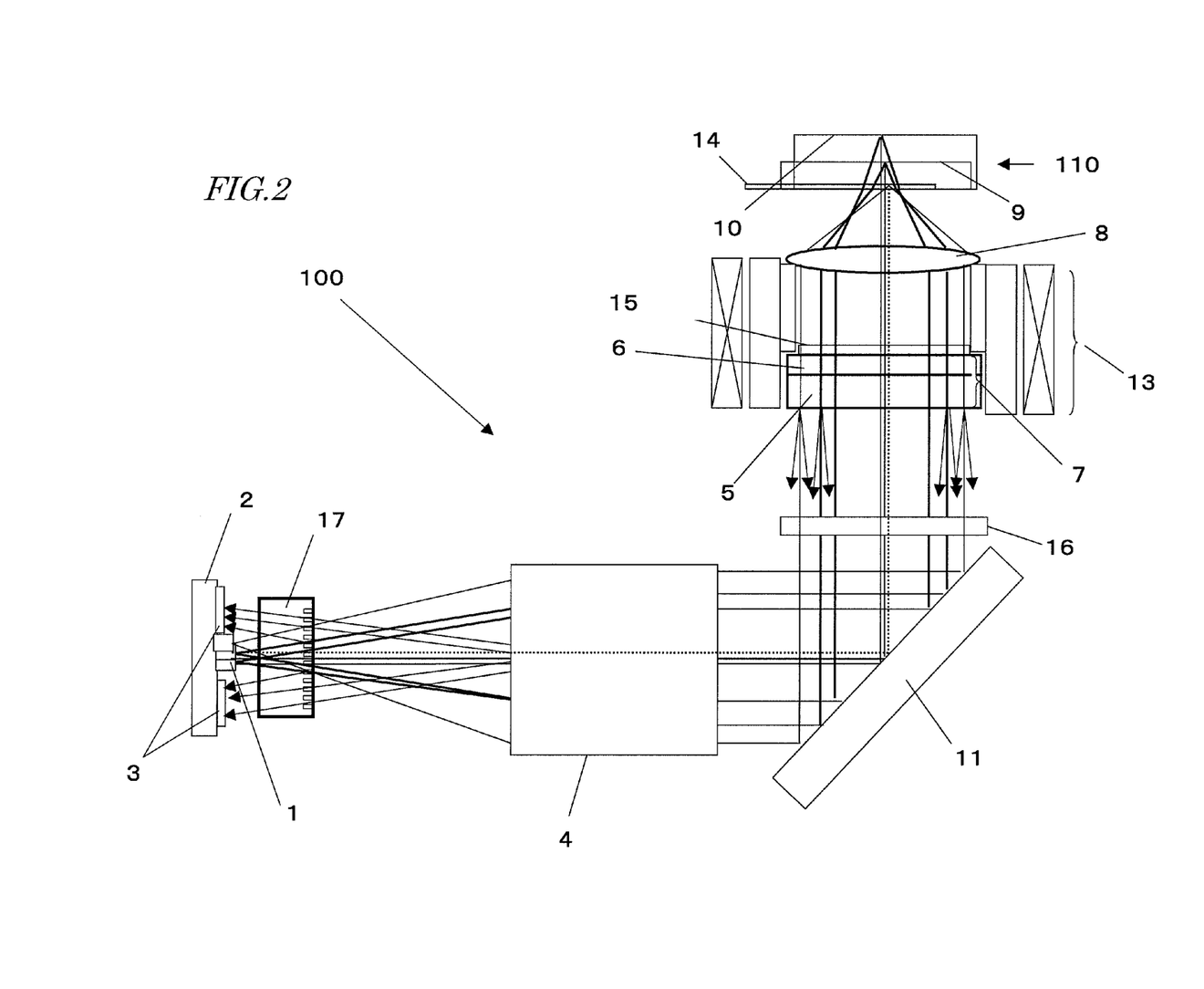
FIG. 2 illustrates an overall arrangement for an optical pickup 100 according to the preferred embodiment of the present invention.

FIG. 2 illustrates an overall arrangement for the optical pickup 100 of this preferred embodiment. The optical pickup 100 includes a unit 2, a hologram 17, a zoom power converter 4, a high reflecting mirror 11, a liquid crystal cell 16, a polarizing hologram element 7, a wavelength selective film 15, an objective lens 8, and an actuator 13. The polarizing hologram element 7 includes a polarizing hologram 5 and a wave plate 6.

With the polarizing hologram 5, the optical pickup 100 of this preferred embodiment can keep the variation in the intensity of the optical signal minimum even if the wavelength of the laser beam has varied, and therefore, can get information read and/or written with good stability. The polarizing hologram 5 will be described in further detail later.

Hereinafter, it will be described exactly where the laser beams with respective wavelengths pass inside the optical pickup 100. In the following description, the laser beams with the respective wavelengths will be described in parallel with each other just for convenience sake. It should be noted, however, that the laser beam with multiple different wavelengths are actually never emitted at the same time.

In the unit 2, a laser chip 1 that emits multiple light beams with mutually different wavelengths and a photodetector 3 are integrated together.

The laser chip 1 of the unit 2 includes three light sources that emit laser beams with wavelengths $\lambda_1$, $\lambda_2$ and $\lambda_3$, respectively, where $\lambda_1 < \lambda_2 < \lambda_3$ is supposed to be satisfied. The wavelength $\lambda_1$ may be 405 nm, for example, and is used to perform a read/write operation on a BD. The wavelength $\lambda_2$ may be 650 nm, for example, and is used to perform a read/write operation on a DVD. And the wavelength $\lambda_3$ may be 780 nm, for example, and is used to perform a read/write operation on a CD. The same statement will also apply to the rest of this description.

No matter which of these laser beams with multiple different wavelengths has been emitted, the photodetector 3 of the unit 2 is always used to receive the light reflected from the optical disc 110.

The hologram 17 arranged near the unit 2 transmits any incoming light, irrespective of its polarization property. Specifically, as for the laser beams with the wavelengths $\lambda_1$ and $\lambda_2$, the hologram 17 perfectly transmits them both on their way toward, and back from, the disc. As for the laser beam with the wavelength $\lambda_3$, on the other hand, the hologram 17 diffracts part of the laser beam to produce first-order diffracted light and transmits most of the laser beam as zero-order light both on its way toward, and back from, the disc.

As used herein, the "way toward the disc" refers to the optical path followed by a laser beam that is directed from a light source toward the optical disc 110, while the "way back from the disc" refers to the optical path followed by a laser beam that is directed from the optical disc 110 toward the photodetector 3.

The laser beam that has been emitted with the wavelength $\lambda_1$, $\lambda_2$ or $\lambda_3$ from the laser chip 1 is transformed by the zoom power converter 4, which is made up of multiple lenses and a structure for changing their relative positions, into a substantially parallel light beam with an appropriate beam diameter.

The light beam that has been transmitted through the zoom power converter 4 is reflected by the high reflecting mirror and then incident on the liquid crystal cell 16, which controls the magnitude of its spherical aberration to be caused when the targets of the laser beam with the wavelength $\lambda_1$ are changed from one storage layer into another in the BD, which is a multilayer storage medium, or according to some unevenness in the thickness of the transmissive layer. The spherical aberration of the transmission wave plane is controlled by the liquid crystal cell 16. Meanwhile, the other laser beams with the wavelengths $\lambda_2$ and $\lambda_3$ are just transmitted, and not affected at all, by the liquid crystal cell 16.

Next, the light beam is incident on the polarizing hologram element 7, in which the incident light is transmitted through the polarizing hologram 5 and the wave plate 6 that form the polarizing hologram element 7 and then through the wavelength selective film 15 that covers the surface of the wave plate 6 of the polarizing hologram element 7. The wavelength selective film 15 is an optical thin film and is provided to optimize the numerical aperture (NA) for the light that is going to enter the objective lens 8. The transmittance of the wavelength selective film 15 varies according to the wavelength of the incident light.

The polarizing hologram 5 is an optical element with polarization dependence. More specifically, the polarizing hologram 5 perfectly transmits a linearly polarized light beam that has been emitted from the laser light source 1 but almost totally diffracts a linearly polarized light beam, of which the polarization direction is perpendicular to that of the former light beam.

The wave plate 6 works just like a quarter-wave plate on both the light beam with the wavelength $\lambda_1$ and the light beam with the wavelength $\lambda_2$. That is why the light beam with the wavelength $\lambda_1$ or $\lambda_2$ that has been transmitted through the wave plate 6 is transformed into a circularly polarized light beam on its way toward the disc through the optical system and then is condensed by the objective lens 8 onto the information storage layer of the optical disc 110.

On receiving the light beam with the wavelength $\lambda_3$, on the other hand, the wave plate 6 works just like a full-wave plate. Thus, the light beam with the wavelength $\lambda_3$ that has been transmitted through the wave plate 6 is transformed into a linearly polarized light beam with an orthogonal polarization direction and then is condensed by the objective lens 8 onto the information storage layer of the optical disc 110.

In FIG. 2, the optical disc 110 may be a BD, a DVD or a CD. If the optical disc 110 is a BD, the focal point of the light beam is controlled so as to be located on an information storage layer 14. On the other hand, if the optical disc 110 is a DVD, then the focal point of the light beam is controlled so as to be located on an information storage layer 9. And if the optical disc 110 is a CD, then the focal point of the light beam is controlled so as to be located on an information storage layer 10. The depths of these information storage layers as measured from the disc surface on which the light is incident are approximately 0.1 mm in a BD, approximately 0.6 mm in a DVD, and approximately 1.2 mm in a CD.

The light beam with the wavelength $\lambda_1$ or $\lambda_2$ that has been reflected from the information storage layer of the optical disc 110 passes through the objective lens 8 and then the polarizing hologram element 7 again. In this case, the reflected light is transformed into a linearly polarized light beam, of which the polarization direction is perpendicular to that of the emitted laser beam, by the wave plate 6 that works just like a quarter-wave plate this time, and therefore, is diffracted and branched by the polarizing hologram 5. This diffracted light beam is reflected by the mirror 11, passed through the zoom power converter 4, not diffracted but just transmitted by the hologram 17 with no polarization dependence, and then incident on the photodetector 3. In response, the photodetector 3 generates and outputs a signal representing a variation in its intensity (such as an RF signal).

Generally speaking, in a disc with a relatively thick transmissive layer such as a CD, the transmissive layer often has birefringence. According to the direction in which the resin material flowed while the transmissive layer was molded, the birefringence of the transmissive layer often has its axis of index ellipsoid defined in either the disc radial direction or the tracking direction.

The light beam with the wavelength $\lambda_3$, which has been transformed into a linearly polarized light beam, has a polarization direction that is parallel to the axis of that index ellipsoid. A linearly polarized light beam is not easily affected by the transmissive layer. That is to say, the light beam reflected from the disc still remains a linearly polarized light beam, no matter whether the transmissive layer has birefringence or not.

The light beam with the wavelength $\lambda_3$ that has been reflected from the information storage layer of the optical disc 110 is transmitted through the objective lens 8 again and then through the wave plate 6. In this case, the reflected light is transformed by the wave plate 6, which works just like a half-wave plate this time, into a linearly polarized light beam that has the same polarization direction as the originally emitted laser beam again. That is why the light beam is never diffracted nor branched by the polarizing hologram 5. But the light beam is diffracted (or reflected) by the mirror 11 and then incident on the hologram 17 by way of the zoom power converter 4. As already described with reference to FIG. 2, the hologram 17 diffracts and branches that light beam and makes it incident on the photodetector 3. In response, the photodetector 3 generates and outputs a signal representing the variation in its intensity (e.g., RF signal).

As for the example illustrated in FIG. 2, control signals such as the focus error signal and the tracking error signal are supposed to be generated by the frontend signal processing section 76. However, those control signals may also be generated and output by the photodetector 3.

Next, the wave plate 6 will be described in detail.

FIGS. 3(a) and 3(b) are respectively a plan view and a side view illustrating the wave plate 6 of this preferred embodiment.

Figure 3:
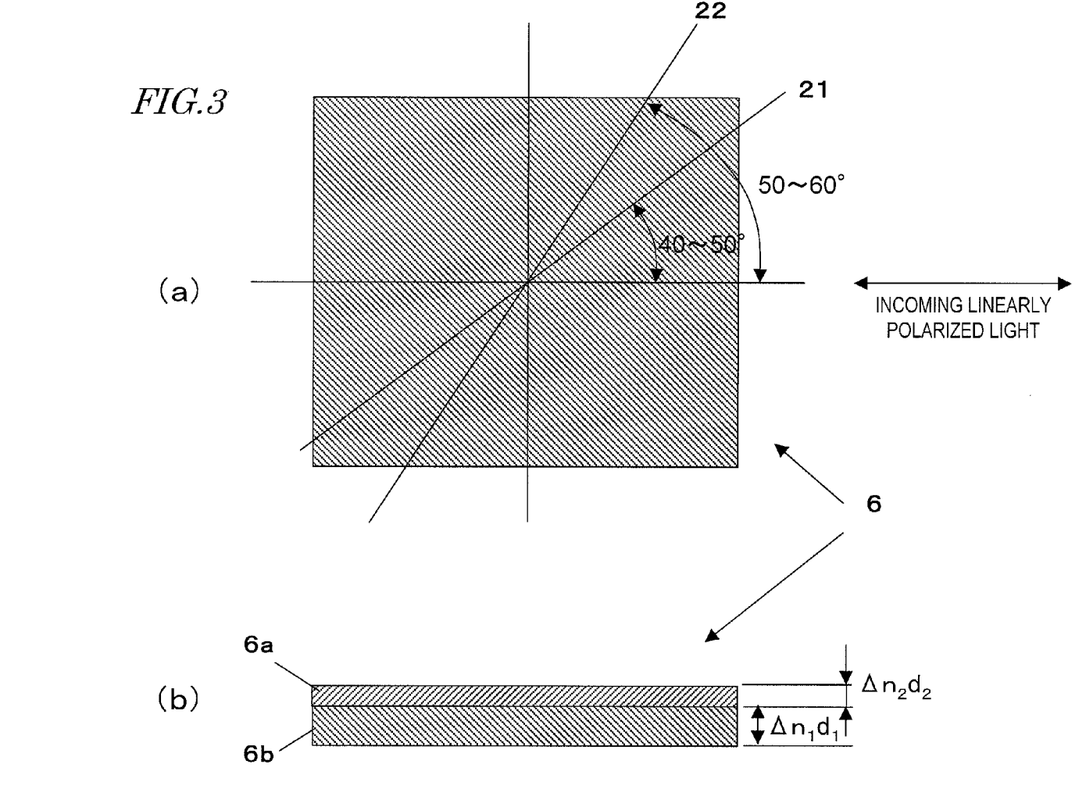
FIGS. 3(a) and 3(b) are respectively a plan view and a side view illustrating a wave plate 6 according to the preferred embodiment of the present invention.

As shown in FIG. 3, the wave plate 6 is formed by stacking two layers 6a and 6b one upon the other. These two layers 6a and 6b have mutually different optical thicknesses and optic axis directions.

The magnitude of the retardation is determined by the optical thicknesses of the two layers 6a and 6b.

The retardation (identified by $\Delta n_1 d_1$ in the figure) of the first layer 6a is defined to fall within the range of $0.7 \lambda_1$ to $0.8 \lambda_1$ with respect to a first optical wavelength $\lambda_1$, the range of $0.4 \lambda_2$ to $0.5 \lambda_2$ with respect to a second optical wavelength $\lambda_2$, and the range of $0.3 \lambda_3$ to $0.4 \lambda_3$ with respect to a third optical wavelength $\lambda_3$, respectively. More specifically, the retardation of the first layer 6a is defined to be approximately $0.75 \lambda_1$, approximately $0.45 \lambda_2$, and approximately $0.33 \lambda_3$ with respect to the first, second and third wavelengths $\lambda_1$, $\lambda_2$ and $\lambda_3$, respectively.

On the other hand, the retardation (identified by $\Delta n_2 d_2$ in the figure) of the second layer 6b is defined to fall within the range of $0.4 \lambda_1$ to $0.5 \lambda_1$ with respect to the first optical wavelength $\lambda_1$, the range of $0.2 \lambda_2$ to $0.3 \lambda_2$ with respect to the second optical wavelength $\lambda_2$, and the range of $0.2 \lambda_3$ to $0.3 \lambda_3$ with respect to the third optical wavelength $\lambda_3$, respectively. More specifically, the retardation of the second layer 6b is defined to be approximately $0.5 \lambda_1$, approximately $0.3 \lambda_2$, and approximately $0.23 \lambda_3$ with respect to the first, second and third wavelengths $\lambda_1$, $\lambda_2$ and $\lambda_3$, respectively.

When these two layers are combined, this wave plate 6 causes a retardation of $1.25 \lambda_1$ with respect to the first optical wavelength $\lambda_1$, i.e., has a very similar property to a 5/4 λ plate. With respect to the second optical wavelength $\lambda_2$, on the other hand, this wave plate 6 causes a retardation of $0.75 \lambda_2$, i.e., has a very similar property to a 3/4 λ plate. And with respect to the third optical wavelength $\lambda_3$, this wave plate 6 causes a retardation of $0.56 \lambda_3$, i.e., has a very similar property to a 1/2 λ plate. In the following description, such properties will be identified herein by "approximately 5/4 λ", "approximately 3/4 λ" and "approximately 1/2 λ", respectively.

Such performance of the wave plate 6 can also be represented in the following manner:

The approximately 5/4 λ property is 450±30 degrees, which corresponds to the range of 1.16 λ to 1.33 λ, more preferably 1.1 λ to 1.3 λ.

The approximately 3/4 λ property is 270±30 degrees, which corresponds to the range of 0.67 λ to 0.83 λ, more preferably 0.6 λ to 0.8 λ.

And the approximately 1/2 λ property is 180±30 degrees, which corresponds to the range of 0.42λ to 0.58 λ, more preferably 0.5 λ to 0.7 λ.

Next, the optic axis directions of the first and second layers 6a and 6b included in the wave plate 6 will be described.

The optic axis direction 21 of the first layer 6a is defined to form an angle of 40 to 50 degrees with respect to the incoming linearly polarized light beam. On the other hand, the optic axis direction 22 of the second layer 6b is defined to form an angle of 50 to 60 degrees with respect to the incoming linearly polarized light beam. Specifically, the present inventors made and arranged a wave plate 6 so that the optic axis direction 21 of the first layer 6a would form angle of 44 degrees with respect to the incoming linearly polarized light beam and that the optic axis direction 22 of the second layer 6b would form angle of 56 degrees with respect to the incoming linearly polarized light beam.

Even if a single-layer wave plate is used instead of such a wave plate consisting of two layers stacked, the retardations can also be defined as described above according to the wavelength. In that case, however, the performance of the wave plate will be as shown in FIGS. 6(a) and 6(b) and the component intensity of the light will vary more significantly according to the wavelength.

On the other hand, if those two layers 6a and 6b are used and arranged so that their optic axes define mutually different angles as is done in this preferred embodiment, widening of the difference between the best values for respective varying wavelengths can be reduced effectively.

The wave plate 6 can be made in the following manner:

First of all, a first wave plate with the optical thickness $\Delta n_1 d_1$ and a second wave plate with the optical thickness $\Delta n_2 d_2$ are provided. In this case, the wave plates may be quartz wave plates, for example. These two wave plates correspond to the two layers 6a and 6b described above.

Next, the two wave plates are bonded together. In this case, first of all, the first wave plate is arranged so that its optic axis direction defines an angle of 40 to 50 degrees with respect to a certain reference axis. This reference axis corresponds to the direction in which the linearly polarized light beam is coming. Next, the second wave plate is arranged so that its optic axis direction defines an angle of 50 to 60 degrees with respect to the reference axis. And then the first and second wave plates are bonded together, thereby obtaining the wave plate 6.

When this wave plate 6 is arranged in the optical pickup 100, the direction of the reference axis needs to agree with the direction in which the linearly polarized light beam that has been emitted from the laser light source is coming.

In the example described above, quartz wave plates are supposed to be used. However, this is just an example. Alternatively, any other wave plates may also be used as long as the two wave plates can be bonded together to meet the optical thickness and optic axis direction conditions described above.

For example, transparent optical elements that meet the optical thickness conditions described above are provided, and an alignment material is applied onto their optical elements and irradiated with a linearly polarized ultraviolet ray. That alignment material is an optical alignment film material that can induce alignment of its polarization direction when irradiated with and exposed to a linearly polarized ultraviolet ray. By irradiating those alignment films with an ultraviolet ray, alignment can be induced in the respective wave plates in the direction in which the linearly polarized light beam is coming. The wave plate 6 may also be formed by bonding together such two wave plates that have been obtained in this manner.

Figure 4:
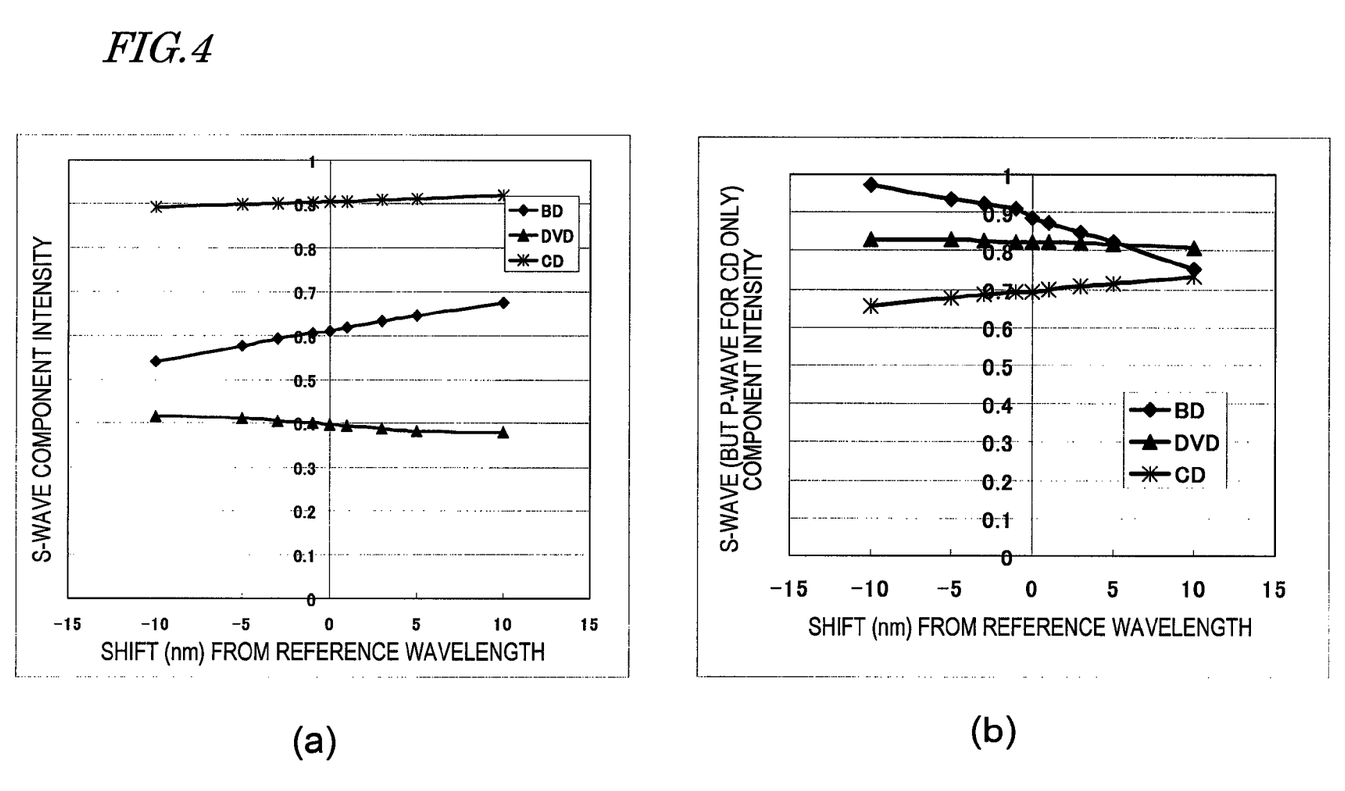
FIGS. 4(a) and 4(b) plot the intensities of S- (or P-) wave components, which have been transmitted through the wave plate 6, with respect to the shift from a reference wavelength.

FIGS. 4(a) and 4(b) plot the intensities of S- (or P-) wave components, which have been transmitted through the wave plate 6, with respect to the shift from a reference wavelength. In FIG. 4, the abscissa represents the magnitude of shift from the reference wavelength, while the ordinate represents a value (component intensity) indicating the polarization state of the light that has passed through a given element on its way toward, and back from, the disc. More specifically, the numerical value representing the polarization state as the ordinate is the transmission intensity of polarized light as viewed through a linear polarizer. For example, supposing the transmitted light intensity of linearly polarized S wave is zero, that of linearly polarized P wave will be one and that of circularly polarized light, which is an intermediate wave between the S and P waves, will be 0.5.

Specifically, FIG. 4(a) shows the polarization state of the light that has just been transmitted through the wave plate 6 of the optical system on its way toward the disc. As described above, at the reference wavelength (i.e., at an abscissa of zero), the wave plate 6 works just like a quarter-wave plate with respect to both the light beam with the wavelength $\lambda_1$ (for use to scan a BD) and the light beam with the wavelength $\lambda_2$ (for use to scan a DVD). Thus, these light beams are transformed into substantially circularly polarized light beams on their way toward the disc. As a result, their ordinate has a value of approximately 0.5. The wave plate 6 also works just like a quarter-wave plate with respect to the light beam with the wavelength $\lambda_3$ (for use to scan a CD) and the light beam has become a linearly polarized light beam that has had its polarization direction rotated 90 degrees. Consequently, its ordinate has a value of approximately one. That is to say, even if the disc has birefringence, the light beam with the wavelength $\lambda_3$ is transmitted through the transmissive layer of the disc as a linearly polarized light beam, of which the polarization direction is parallel to the axis of its index ellipsoid. For that reason, the light beam with the wavelength $\lambda_3$ is hardly affected by the birefringence.

As can be seen from FIG. 4(a), for each of the light beams with the wavelengths $\lambda_1$, $\lambda_2$ and $\lambda_3$, even if the wavelength has shifted from the reference wavelength, the polarization state will still vary much less significantly than in FIG. 6(a). Look at the plot of the light beam with the shortest wavelength ($\lambda_1$=405 nm) to scan a BD, among other things, and it can be said that its ordinates scarcely vary. In other words, the variation in polarization state according to the varying wavelength is very little because the retardation of the wave plate 6 given by Equation (1) is small.

FIG. 4(b) shows the polarization state of the light that has just been transmitted through the wave plate in the optical system on its way back from the disc. The ordinate plotted in FIG. 4(b) represents the intensity of the S wave component (but that of the P wave only for the light beam to scan a CD).

The light beam with the wavelength $\lambda_1$ (to scan a BD) and the light beam with the wavelength $\lambda_2$ (to scan a DVD) are transmitted through the wave plate on their way toward, and back from, the disc. At the reference wavelength (i.e., at an abscissa of zero), the light beam on its way back from the disc is transformed into linearly polarized light (S wave), of which the polarization direction is substantially perpendicular to that of the light beam on its way toward the disc. It can be seen that in that case, the intensity of the optical signal is somewhat lower than the conventional one shown in FIG. 6 but that the polarization state still varies very little even if the wavelength has shifted from the reference wavelength. This means that the intensity of the light reflected from the disc, i.e., the optical signal, hardly varies. On the other hand, in a situation where the light beam with the wavelength $\lambda_3$ (to scan a CD) is transmitted through the wave plate, that light beam remains linearly polarized light on its way back from the disc. Even so, the intensity of the optical signal is somewhat lower than the conventional one shown in FIG. 6 but the polarization state still varies very little even if the wavelength has shifted from the reference wavelength. With the wave plate of this preferred embodiment, the reference value of the optical signal intensity is lower than in the conventional wave plate. However, since the magnitude of decrease is small, such a decrease can be easily compensated for by adjusting the gain of the circuit without sacrificing the signal quality.

The present inventors tried designing a wave plate by setting conditions so that even if the wavelength of the light beam shifted, the magnitude of variation in the polarization state of the light beam transmitted through the wave plate could still be reduced to a desired one. If the wave plate had a single-layer structure, however, the present inventors found it difficult to work out a solution that would realize a wave plate with the required level of performance. To overcome such a problem, the present inventors adopted a two-layer structure for the wave plate, thereby obtaining successfully a wave plate that could meet the optical thickness condition and that could minimize the variation in the polarization property of the light even when the wavelength shifted.

To adopt such a two-layer structure for the wave plate, the present inventors found appropriate combinations of four parameters (consisting of the respective optical thicknesses and optic axis directions of the two layers) and three different wavelengths that would limit the variations in polarization state due to the wavelength shift within desired ranges. And those are the optical thickness and optic axis direction ranges defined above.

As described above, according to preferred embodiments of the present invention, even if light beams with three different wavelengths are subject to some inevitable errors that should occur due to a wavelength shift of the laser light source or a wavelength variation with the temperature, read/write operations can still get done just as intended with the variation in the intensity of the optical signal reduced to a very low level. As for the arrangement of the optical pickup, the number of layers in the wave plate needs to be increased by just one, compared to the conventional structure. On top of that, such a wave plate can be built in the optical pickup as a single wave plate 6 consisting of two layers. That is why the number of optical members to assemble together does not increase, thus keeping the optical system no less simple than the conventional one. As a result, an optical pickup that can perform a read/write operation on multiple different types of optical discs with mutually different transmissive layer thicknesses and storage densities using light beams with three different wavelengths can be provided in a small size and at a reduced cost.

On top of that, the intensity of the light detected can also be stabilized with respect to a disc with a thick transmissive layer and a high degree of birefringence such as CDs. And a high light propagation rate can be maintained with respect to an optical system that uses a short-wave light beam for BDs, DVDs and other optical discs, which have a thin transmissive layer and a low degree of birefringence but for which it is difficult to achieve a high laser output power.

In the preferred embodiment described above, an optical pickup, in which the laser light source and the photodetector are integrated together and in which the same objective lens is used at all of the three different wavelengths, is supposed to be used to simplify the optical system. According to the present invention, however, the three light sources that emit laser beams with multiple different wavelengths and the detector do not have to be integrated together. Also, according to the present invention, the laser beam may be condensed either by only one lens or using multiple different lenses selectively according to the wavelength. In any case, the effects of the present invention described above can be achieved as long as the wave plate of the present invention is arranged along the optical path to be followed by every laser beam emitted from the light sources both on their way toward the disc and on their way back from the disc toward the photodetector.

The optical pickup of the present invention can be used effectively in an optical information reading and writing apparatus for performing a read/write operation on multiple different types of optical storage media by itself. Among other things, the present invention is applicable particularly effectively to a CD, DVD, Blu-ray or any other optical disc recorder that should have as small a size as possible and be manufactured at as low a cost as possible by integrating light sources with multiple different wavelengths and photodetector together.

What is claimed is:

1. An optical pickup for emitting light toward an optical disc, receiving the light that has been reflected from the optical disc, and outputting a signal representing intensity of the reflected light, the optical pickup comprising:
three light sources for emitting three light beams that are linearly polarized and have wavelengths $\lambda_1$, $\lambda_2$ and $\lambda_3$, respectively, where $\lambda_1 < \lambda_2 < \lambda_3$;
at least one lens for condensing the light beams that have been emitted from the three light sources;
a photodetector for receiving the light beams that have been reflected from the optical disc; and
a wave plate, which is arranged on an optical path to be followed by all of the light beams emitted from the three light sources both on their way toward the optical disc and on their way back from the optical disc toward the photodetector,
wherein the wave plate has first and second layers, of which the retardations and optic axis directions are different from each other, and
wherein sum of the retardations of the first and second layers is defined to be approximately $5/4\,\lambda_1$, approximately $3/4\,\lambda_2$, and approximately $1/2\,\lambda_3$ with respect to the light beams with the wavelengths $\lambda_1$, $\lambda_2$ and $\lambda_3$, respectively, and
wherein there is a difference in optic axis direction between the first and second layers, and
wherein by taking advantage of the difference in optic axis direction, the linearly polarized light beams with the wavelengths $\lambda_1$ and $\lambda_2$ on their way toward the optical disc are transformed into circularly polarized light beams, and the circularly polarized light beams on their way back from the optical disc are transformed into linearly polarized light beams, of which polarization direction is perpendicular to that of the light beams on their way toward the optical disc, thereby transmitting the light beam with the wavelength $\lambda_3$ as the linearly polarized light beam both on its way toward, and back from, the optical disc.

2. The optical pickup of claim 1, wherein the retardation of the first layer of the wave plate is defined to fall within the range of $0.7\,\lambda_1$ to $0.8\,\lambda_1$ with respect to the light beam with the wavelength $\lambda_1$, the range of $0.4\,\lambda_2$ to $0.5\,\lambda_2$ with respect to the light beam with the wavelength $\lambda_2$, and the range of $0.3\,\lambda_3$ to $0.4\,\lambda_3$ with respect to the light beam with the wavelength $\lambda_3$, respectively, and
wherein the retardation of the second layer of the wave plate is defined to fall within the range of $0.4\,\lambda_1$ to $0.5\,\lambda_1$ with respect to the light beam with the wavelength $\lambda_1$, the range of $0.2\,\lambda_2$ to $0.3\,\lambda_2$ with respect to the light beam with the wavelength $\lambda_2$, and the range of $0.2\,\lambda_3$ to $0.3\,\lambda_3$ with respect to the light beam with the wavelength $\lambda_3$, respectively, and
wherein the optic axis directions of the first and second layers are defined to form an angle of 40 to 50 degrees and an angle of 50 to 60 degrees, respectively, with respect to any of the incoming linearly polarized light beams.

3. A wave plate for use in an optical pickup for emitting light toward an optical disc, receiving the light that has been reflected from the optical disc, and outputting a signal representing intensity of the reflected light, the optical pickup comprising:
three light sources for emitting three light beams that are linearly polarized and have wavelengths $\lambda_1$, $\lambda_2$ and $\lambda_3$, respectively, where $\lambda_1 < \lambda_2 < \lambda_3$;
at least one lens for condensing the light beams that have been emitted from the three light sources; and
a photodetector for receiving the light beams that have been reflected from the optical disc,
wherein the wave plate has first and second layers, of which the retardations and optic axis directions are different from each other, and
wherein sum of the retardations of the first and second layers is defined to be approximately $5/4\,\lambda_1$, approximately $3/4\,\lambda_2$, and approximately $1/2\,\lambda_3$ with respect to the light beams with the wavelengths $\lambda_1$, $\lambda_2$ and $\lambda_3$, respectively, and
wherein there is a difference in optic axis direction between the first and second layers, and
wherein by taking advantage of the difference in optic axis direction, the linearly polarized light beams with the wavelengths $\lambda_1$ and $\lambda_2$ on their way toward the optical disc are transformed into circularly polarized light beams, and the circularly polarized light beams on their way back from the optical disc are transformed into linearly polarized light beams, of which polarization direction is perpendicular to that of the light beams on their way toward the optical disc, thereby transmitting the light beam with the wavelength $\lambda_3$ as the linearly polarized light beam both on its way toward, and back from, the optical disc.

4. The wave plate of claim 3, wherein the retardation of the first layer is defined to fall within the range of $0.7\,\lambda_1$ to $0.8\,\lambda_1$ with respect to the light beam with the wavelength $\lambda_1$, the range of $0.4\,\lambda_2$ to $0.5\,\lambda_2$ with respect to the light beam with the wavelength $\lambda_2$, and the range of $0.3\,\lambda_3$ to $0.4\,\lambda_3$ with respect to the light beam with the wavelength $\lambda_3$, respectively, and
wherein the retardation of the second layer is defined to fall within the range of $0.4\,\lambda_1$ to $0.5\,\lambda_1$ with respect to the light beam with the wavelength $\lambda_1$, the range of $0.2\,\lambda_2$ to $0.3\,\lambda_2$ with respect to the light beam with the wavelength $\lambda_2$, and the range of $0.2\,\lambda_3$ to $0.3\,\lambda_3$ with respect to the light beam with the wavelength $\lambda_3$, respectively, and
wherein the optic axis directions of the first and second layers are defined to form an angle of 40 to 50 degrees and an angle of 50 to 60 degrees, respectively, with respect to any of the incoming linearly polarized light beams.

5. An optical disc apparatus comprising:
the optical pickup of claim 1;
a motor for rotating the optical disc; and
a control section for controlling the optical pickup and the motor,
wherein the control section controls the optical pickup so that a light beam is continuously condensed on an information storage layer of the optical disc in response to an output signal of the optical pickup.

* * * * *